Patented Nov. 27, 1928.

1,693,237

UNITED STATES PATENT OFFICE.

WALTER A. KUHNERT, OF LOS ANGELES, CALIFORNIA.

PROCESS FOR RECOVERY OF SODIUM SALTS FROM BRINES.

No Drawing. Application filed March 29, 1927. Serial No. 179,400.

This invention relates to a process for treatment of brines containing relatively high percentages of sodium carbonate, for the purpose of recovering soda therefrom. The process is particularly advantageous in connection with such brines which also contain borax in solution and in such cases the process also includes the recovery of such borax from the brine.

The principal object of the invention is to provide for the recovery of a maximum portion of the soda content of such a brine, at a minimum expenditure of time and money, and to also recover borax in case such salt is contained in the brine in sufficient quantity to make its recovery profitable.

A particular object of the invention is to recover the different salts separately from one another and in a state of high purity, so that a minimum amount of purifying treatment is required.

A further object of the invention is to recover the soda in two stages, first obtaining a portion of such soda in the form of sodium sesquicarbonate, and then a further portion in the form of sodium bicarbonate, with or without an intervening removal of borax.

My invention is applicable particularly to the brines now existing in Owens Lake, California, but may be also applied generally to other complex brines containing such high percentages of soda as to make the recovery thereof by ordinary methods practically impossible or impracticable for the reasons hereinafter mentioned, and particularly to brines containing materially in excess of 10% normal sodium carbonate.

The commercial production of sodium bibarbonate from natural brines by direct carbonation has heretofore been accomplished exclusively by the carbonation of such brines as contained, among other salts, an amount of sodium carbonate less than, or but little in excess of, 10% of the weight of the brine. The reason for this limitation in the concentration of the normal carbonate in the brines heretofore treated may be seen from a consideration of the chemical and physical results that are obtained in the carbonation procedure now employed in the art.

It is at present customary to effect the recovery of sodium bicarbonate from natural brines of the general type under discussion, by subjecting such brines to carbonation with kiln-gas containing from 33% to 38% of carbon dioxide by volume, and to supply such gas at such a rate and under such conditions as to cause absorption of about 30 pounds of carbon dioxide per hour per 1000 gallons of brine. This procedure causes a chemical reaction to ensue between the carbon dioxide, water and normal sodium carbonate of the brine, which results in the formation of sodium bicarbonate; and owing to the comparatively low solubility of this salt, here still further depressed by the other salts in the brine, the bulk of the sodium bicarbonate thus formed is precipitated from solution during the period of carbonation.

The chemical reaction involved in the carbonation, however, is exothermic, and the presence of other salts such as borax in the brine prohibits the successful application of ordinary cooling methods during the course of carbonation, because of excessive cooling of the brine in contact with the cooling means and consequent precipitation of such salts to form a coating thereon. It follows therefore that the precipitation of the sodium bicarbonate must occur at whatever temperature the mother liquor may have at the moment of precipitation. Under these conditions, and in the presence of a high concentration of sodium carbonate, the temperature steadily rises as carbonation proceeds, and the texture or size of the sodium bicarbonate crystals obtained is subject to great variation, the size of the crystals becoming progressively smaller and more difficult to recover and to purify as the temperature of the mother liquor increases during the carbonation. A further objection to the above described mode of procedure is that above a certain temperature the rate of absorption of carbon dioxide in the brine decreases rapidly so that a poor efficiency of utilization of carbon dioxide results.

In these circumstances it will be seen that a limit in the concentration of normal sodium carbonate is required in brines from which commercially pure sodium bicarbonate is to be recovered by the carbonation method now in use. Actual operating results, guided by the necessity of maintaining standard purities, have shown the current carbonating procedure to be unsuited for treatment of natural carbonate brines of the Owens Lake, California, type, when such brines contain normal sodium carbonate materially in excess of 10% by weight. In confirmation of this, it is a matter of record that following the summer of 1921, when the residual brine of Owens Lake became decidedly richer in normal carbonate concentration than 10% by weight, the established soda producers at the source completely abandoned carbonation of the natural brine and substituted artificial solutions obtained by leaching natural precipitates of sodium carbonates and other salts, with fresh water. This method of controlling the concentration of normal sodium carbonate in solutions intended for carbonation is still being followed there, while the true residual lake-brine, now regularly containing from 14% to nearly 16% of normal sodium carbonate throughout the major portion of the year, is left untouched.

I have found, however, that these objections can be overcome to a large extent at least, by conducting the first stage of the carbonating operation under such conditions, particularly as regards rate of supply or absorption of carbon dioxide, as to prevent an excess rise in temperature and at the same time cause precipitation of the soda in the form of sodium sesquicarbonate rather than bicarbonate, until the soda concentration is reduced to a certain point such that more rapid carbonation would not cause too rapid a reaction and a consequent objectionable rise in temperature. This precipitation of soda in the form of sodium sesquicarbonate is brought about by maintaining a materially lower rate of absorption of carbon dioxide in the brine than heretofore, which may be accomplished either by suitably reducing the concentration of carbon dioxide in the carbonating gas or by reducing the rate of supply of the carbon dioxide bearing gas to the brine or by reducing both of these factors, and also by properly controlling the temperature. The necessary control of temperature is largely provided for automatically by the lower rate of carbonation, which prevents the former excessive rise of temperature; but special means might be employed if desired for removing heat from the brine during the carbonating operation so as to further assist in preventing the temperature thereof from rising above the desired point.

The recovery of sodium sesquicarbonate from such brines by carbonation in the manner above described is disclosed and claimed in my United States Patent No. 1,618,834, issued February 22, 1927, while the recovery of sodium sesquicarbonate in this manner, followed by recovery of borax from the mother liquor, is disclosed and claimed in my United States Patent No. 1,618,835, issued February 22, 1927. According to my present invention however, the brine, after precipitation and separation therefrom of a portion of the soda in the form of sodium sesquicarbonate by carbonation in this manner, and either with or without a subsequent separation of borax therefrom, is then subjected to a second carbonating operation at the same or a higher rate than before so as to precipitate a further quantity of soda in the form of substantially pure sodium bicarbonate, which is then separated from the brine in any suitable manner. The sodium bicarbonate obtained in this last stage of the operation is of exceptionally high purity because of the fact that other salts which would otherwise be precipitated during or following the carbonating operation and hence impair the purity of the product have already been largely or entirely removed from the brine by the first carbonating operation and the subsequent cooling operations. Furthermore, in case the original brine contains borax in relatively large amounts, such borax will in general have been removed before this second carbonating operation and there will therefore be little or no tendency for borax to precipitate and contaminate the precipitated bicarbonate during the mechanical operations required for separation of the sodium bicarbonate from the brine following the carbonating operation.

I will describe my invention as applied to the treatment of a brine such as is found in Owens Lake, California, one example of such brine, after solar concentration, being of approximately the following composition:

|  | Per cent. |
|---|---|
| $Na_2CO_3$ | 14.60 |
| $Na_2B_4O_7$ | 4.36 |
| $NaCl$ | 8.27 |
| $KCl$ | 5.66 |
| $Na_2SO_4$ | 3.19 |
| Other salts and water | 63.92 |
| Total | 100.00 | it being understood that the composition of this brine will change considerably from time to time owing to variations in temperature, evaporation and other conditions.

The brine is, if necessary, first brought by solar evaporation or otherwise to a condition of substantial saturation with respect to sodium carbonate at the temperature of the brine, which in the summer may be in the neighborhood of 100° F. The saturated brine having, for example, the composition represented in the above table, is then pumped into any suitable receptacle or tank, and is subjected to the action of carbon dioxide obtained in any suitable manner, for example, from a lime kiln or from a receptacle containing liquid carbon dioxide under pressure. The gases from the lime kiln containing the desired proportion of carbon dioxide are pumped by means of any suitable blower, fan, or compressor into contact with the brine. In order to provide effective contact, the gas containing carbon dioxide may be forced into the body of brine under pressure so as to cause the gas to bubble up through the brine and thereby bring the carbon dioxide into intimate contact with the brine. The carbon dioxide is absorbed or reacts with the soda in its passage through the brine while the remaining inert gas serves to very thoroughly agitate the brine, thus facilitating the reaction. This operation may, for example, be conducted in carbonating towers of the type ordinarily used for carbonation of such brines, said towers being provided for example with perforated diaphragms or other baffle means at intervals throughout the height thereof so as to assist in the distribution of the gas and provide the highest degree of agitation of the brine and the most intimate contact between carbon dioxide and brine.

Heretofore in the separation of soda as sodium bicarbonate from brine of this character it has been usual to supply the carbon dioxide bearing gas at a concentration of about 33% or more of carbon dioxide by volume and to supply such gas at a relatively high rate, for example, at such a rate, that for a single batch of brine containing, say 18.000 gallons, about 5,000 pounds of carbon dioxide were absorbed in 9 hours. This corresponds to an absorption of 30.9 pounds of carbon dioxide per hour per 1000 gallons of brine. In the operation, as carried out in this manner on brines of this character containing substantially the concentration of sodium carbonate above mentioned, the reaction has gone so rapidly that it has been found to be impracticable by any of the well-known cooling means available to prevent an excessive rise in temperature of the brine, say to a temperature above 45° C., and the precipitation of soda therefore occurred in a very finely crystalline or mushy condition, so that it was extemely difficult to separate it from the solution by centrifuging, filtering or settling, and was also difficult to wash the crystals. I have found, however, that by maintaining a materially lower rate of absorption of carbon dioxide in the brine than heretofore, which may be accomplished either by suitably reducing the concentration or carbon dioxide in the carbonating gas or by reducing the rate of supply of the carbon dioxide bearing gas to the brine or by reducing both the carbon dioxide content and the rate of supply of the gas, and by properly controlling the temperature, a portion of the soda can be precipitated largely or wholly in the form of sodium sesquicarbonate and in a comparatively coarse crystalline condition. The necessary control of the temperature is provided automatically, to a large extent at least, by the reduction in the rate of carbonation which slows down the reaction and hence prevents the excessive rise of temperature above mentioned.

I have obtained good results by carrying out the first carbonating operation in the following manner. The carbon dioxide bearing gas coming from the lime kiln or other supply means is, if necessary, during the first stage of the carbonating operation, diluted with air or with other inert gas so as to present a concentration of about 23 to 28% of carbon dioxide, and this gas is brought into contact with the solution in the manner above described at a temperature preferably about 37° C. (or say from 30° C. to 45° C.) and at such a rate and in such manner as to cause absorption of about 1700 pounds of carbon dioxide in an 18,000 gallon batch of brine in about 120 hours. This represents an absorption of only 7.9 pounds of carbon dioxide per hour per 1000 gallons of brine. It will be seen that under these conditions the rate of absorption of carbon dioxide is materially slower than under the conditions heretofore practiced, so that the tendency to heating of the brine by the exothermic reaction is much less, and the precipitate formed by such carbonation is largely or wholly in the form of sodium sesquicarbonate and is of a coarsely crystalline nature. Carbonation under the conditions and for the period above mentioned has served to reduce the sodium carbonate content of a brine from about 14% to about 8%. In general, I prefer to supply the carbonating gas during this first stage of the operation at such a rate, with such a concentration of carbon dioxide, and under such conditions of distribution, agitation, and temperature, as to cause absorption of carbon dioxide by the brine at only about one quarter to one half the rate of absorption formerly prevailing, or say from 7 to 15 pounds of carbon dioxide per hour per 1000 gallons of brine, and in any event, the rate of absorption should not exceed 20 pounds of carbon dioxide per hour per 1000 gallons of brine in order to effect precipitation of the soda in the desired form.

The carbonating operation may be carried out as above described until the concentration of soda is reduced to the desired extent, say to 8% or less. The point of which this concentration is so reduced should be sufficiently low so that the remaining brine may be subsequently carbonated so as to cause precipitation of sodium bicarbonate without producing too rapid a rate of reaction and a consequent precipitation in finely divided condition. When the sodium carbonate content of the brine has been reduced to the desired point, the brine, containing the precipitated material in suspension therein may be removed from the carbonating towers and passed through suitable separating means such as centrifuging or filtering apparatus, or both, for separation of the precipitated sodium sesquicarbonate along with any sodium bicarbonate or other salts which may have been precipitated at the same time. It will be understood, however, that in general the rate of carbonation during this first stage is such as to provide for a minimum amount of precipitation in the form of sodium bicarbonate, so that the solid product obtained in this first separating operation consists principally of sodium sesquicarbonate. This sesquicarbonate may be washed, either in the centrifuging or filtering apparatus, or in any other suitable manner, so as to remove therefrom the mother liquor adhering to the crystals and also more or less completely remove small amounts of more soluble impurities thereto. An important advantage of precipitating the soda in the form of coarsely crystalline sodium sesquicarbonate is that, because of its coarsely crystalline nature, such material is readily separated from the brine, and washed free of adhering impurities, both suspended and soluble, so that it is easily and economically obtained in a high state of purity. The sodium sesquicarbonate as so obtained is marketable as such, or may be readily converted to any of the standard soda compounds such as soda ash, sodium hydroxide, etc.

If it is desired to recover borax as well as soda from the brine, and if the original brine contains sufficient borax in solution to permit such recovery, the remaining brine or mother liquor, after separation of the precipitated material therefrom is passed to vats or tanks where it is cooled to a suitable temperature, for example to 20° C. or below, and agitated from time to time for a period of two to three days. The cooling may be accomplished in any suitable manner, for example by spraying in spray cooling apparatus, or by cooling towers, or by circulating suitable cooling medium such as cold brine through cooling coils in said tanks or vats, and the agitating may be accomplished either in said tanks or vats in any suitable manner or by circulating the solution from time to time from the vats through suitable agitating means and back to the vats again, or otherwise. Upon cooling in this manner a substantial portion of the borax content of the brine is precipitated as crude borax, the amount so recovered being for example 50% to 75% or more of the original borax content of the brine. As a particular example, the borax concentration of certain concentrated brines, when treated in this manner, has been reduced from about 4½% anhydrous borax to about 1½%. The resulting precipitated crude borax is then separated from the mother liquor by decantation, filtration or otherwise, redissolved in warm water, filtered to free the solution from impurities such as alumina and silica precipitated along with the borax, and is then finally recrystallized as pure borax and dried.

It will be seen that the first carbonating operation acts not only to precipitate sodium sesquicarbonate, but also to decrease the solubility of the borax and cause the same to precipitate upon subsequent cooling of the solution. This may be explained as being due to some action of the sodium silicate and sodium aluminate (which are known to be present in appreciable quantities in such brines), in inhibiting the precipitation of the borax, so that the crude brine contains borax in solution considerably in excess of the normal solubility thereof in water. The carbon dioxide reacts with such sodium silicate and sodium aluminate, resulting in the formation of corresponding amounts of sodium carbonate and of hydrated silica and alumina. The silica and alumina resulting from such reaction precipitate during and following the carbonating operation, thus removing the factors tending to hold the borax in solution, so that upon subsequent cooling of the solution a considerable proportion of the borax in excess of the normal solubility thereof precipitates out. As evidence in support of this explanation I have found that only brines containing such sodium silicate and sodium aluminate appear to be capable of maintaining the high borax solubility found in this crude brine and also that whenever the brine is treated to remove such constituents therefrom the borax solubility is reduced.

For example, portions of the brine were diluted with 15 parts of distilled water to 1 part of brine, placed in stoppered bottles and kept at the temperature of the steam bath for approximately 2 months, during which time a gradual deposition of flocculent silica and alumina occurred. The brine was then rapidly reconcentrated to its original volume, under such conditions as to prevent absorption of gases thereby during the process, and then cooled to the initial temperature. Analysis of these portions of brine before and after such treatment showed that an average of 72.2% of the silica and a substantially equal proportion of the alumina had been removed, and that as a consequence 79.8% of the borax, in excess of the normal solubility thereof, was precipitated upon cooling. Another test which has been made to demonstrate this effect of the sodium silicate and sodium aluminate content of the brine consisted in the addition to a sample of brine of an equal volume of methyl alcohol, digesting the mixture for several days, filtering off the precipitated silica and alumina, reconcentrating to original volume, chilling to original temperature, and then filtering out the precipitated borax. This treatment reduced the silica and alumina content by 25.5%, and the borax, in excess of the normal solubility thereof, by 24.3%.

After separation of the borax as above described the brine still contains a considerable proportion of sodium carbonate in solution, for example 8% or less, depending upon the point at which the first carbonating operation was terminated. According to my invention a further amount of this soda is recovered from the brine by subjecting the same to a second carbonating operation, using any suitable rate of carbonation. Since the soda content of the brine has already been reduced below 10% the carbonation may now be carried out more rapidly than in the first stage without danger of an excessive rise in temperature and consequent formation of a fine mushy precipitate. This carbonating stage may therefore be conducted in substantially the same manner as the ordinary carbonating process heretofore employed on natural brines containing less than 10% sodium carbonate, and in order to shorten the time required for this second carbonating operation I prefer in general to use a higher rate of carbonation than in the first carbonating operation, using for this purpose a higher rate of supply of carbon dioxide bearing gas, or a gas richer in carbon dioxide, or both. Such gas may contain for example about 30 to 33% or more of carbon dioxide by volume and may be supplied at such a rate and under such conditions as to cause absorption thereof at a rate of from 25 to 30 pounds or more per hour per 1000 gallons of brine. The carbonation may be conducted in towers of the same sort as those described above in connection with the first carbonating operation, or in any other suitable apparatus.

During this second carbonating operation a further portion of the soda content of the brine is precipitated chiefly in the form of sodium bicarbonate. Because of the relatively low concentration of soda then existing in the brine the reaction occurs at only a moderate rate and hence does not produce heat so rapidly as to heat the brine to an excessively high temperature. Under the conditions then prevailing the carbonation can be conducted quite rapidly without causing the temperature of the brine to rise above 35° C. and the precipitate obtained is therefore of a coarsely crystalline nature as distinguished from the fine, mushy precipitates obtained at higher temperatures. The precipitate furthermore is of a very high degree of purity due to the previous removal from the brine of those impurities which would otherwise contaminate the sodium bicarbonate at this stage. This carbonating operation may be continued until the desired soda removal is obtained, for example until the soda content of the brine is reduced to say 2 to 4% normal sodium carbonate. It will be evident that as the soda content of the brine decreases the rate of precipitation will also decrease. Therefore if it is attempted to carry the soda recovery beyond a certain point poor efficiency of utilization of carbon dioxide will be experienced. The point at which this carbonating operation is stopped will therefore depend upon a consideration of the above factors.

After the completion of this second carbonating operation the precipitated sodium bicarbonate is subjected to centrifuging, filtering or other operations for removal therefrom of adhering mother liquor, after which it is ready for such further treatment as may be desired.

In cases where the brine does not contain sufficient borax to permit the same to economically be recovered therefrom as above described, or if it is not desired to recover borax from the brine for any reason, the cooling step above described may be eliminated, and the brine, immediately after separation therefrom of the precipitate resulting from the first carbonating operation, may be subjected to the second carbonating operation. The process when so carried out has the advantage that the precipitate obtained during the first carbonation and consisting largely of sodium sesquicarbonate is recovered separately from the precipitate produced during the second carbonation and consisting principally of sodium bicarbonate. Also this latter precipitate is obtained in a high state of purity and requires little or no purifying treatment. Furthermore, with certain brines, if it were attempted to make the entire soda recovery in one operation the precipitate would be so bulky that it would be extremely difficult if not actually impossible to satisfactorily conduct the latter part of the carbonating operation and to subsequently remove the precipitate from the carbonating equipment. It will be seen that in any event the process above described has marked advantages over any previously developed process for the treatment of similar brines.

I claim:

1. The process for recovery of carbonate compounds of sodium from brines containing the same, which comprises first carbonating such a brine by contact with carbon dioxide bearing gas, while maintaining the rate of supply of carbon dioxide to the brine sufficiently low to maintain the temperature below 45° C. and cause precipitation to occur principally in the form of coarsely crystalline sodium sesquicarbonate, until the concentration of sodium carbonate in the brine has been materially reduced, then discontinuing the carbonating operation and separating the resulting precipitate from the brine, subsequently further carbonating such brine by contact with carbon dioxide bearing gas to cause further precipitation to occur principally in the form of sodium bicarbonate, and then separating the resulting further precipitate from the brine.

2. A process as set forth in claim 1, in which a higher rate of supply of carbon dioxide to the brine is maintained during said further carbonating operation than during the first named carbonating operation.

3. The process for recovery of carbonate compounds of sodium from complex brines containing materially in excess of 10% normal sodium carbonate, which comprises carbonating such a brine by contact with carbon dioxide bearing gas therewith, while maintaining the rate of supply of carbon dioxide to the brine sufficiently low to so retard the carbonating reaction as to prevent the brine from being heated by the heat of such reaction to a temperature above 45° C. and hence cause precipitation to occur during such carbonating operation principally in the form of coarsely crystalline sodium sesquicarbonate, until the sodium carbonate content of the brine is reduced below 10%, then discontinuing such carbonating operation, separating the resulting precipitate from the brine, subsequently subjecting the brine to a further carbonating operation by contact with carbon dioxide bearing gas so as to cause further precipitation to occur principally in the form of sodium bicarbonate and then separating the resulting further precipitate from the brine.

4. A process for recovering carbonate compounds of sodium from complex brines containing the same, which consists in carbonating such a brine by contact with carbon dioxide bearing gas containing less than 33% carbon dioxide in such manner as to cause precipitation of a portion of the soda content of the brine in the form of sodium sesquicarbonate during such carbonating operation, discontinuing such carbonating operation and separating the resulting precipitate from the brine, subsequently subjecting the brine to a further carbonating operation by contact with carbon dioxide bearing gas to cause precipitation of a further portion of the soda content of the brine principally in the form of sodium bicarbonate during such further carbonating operation, and then separating the resulting further precipitate from the brine.

5. The process for recovery of soda compounds from complex brines containing materially in excess of 10% normal sodium carbonate, which comprises carbonating such a brine by contact with carbon dioxide bearing gas in such manner as to cause absorption of carbon dioxide by the brine at a rate of less than 20 pounds of carbon dioxide per hour per 1000 gallons of brine and hence cause precipitation to occur principally in the form of coarsely crystalline sodium sesquicarbonate, until the sodium carbonate content of the brine is reduced below 10%, then discontinuing such carbonating operation and separating the resulting precipitate from the brine, subsequently subjecting the brine to a further carbonating operation by contact with carbon dioxide bearing gas in such manner as to cause absorption of carbon dioxide by the brine at a rate materially higher than in the first named carbonating operation and hence cause further precipitation, principally in the form of sodium bicarbonate, and then separating the resulting further precipitate from the brine.

6. The process for recovery of sodium compounds from complex brines containing materially in excess of 10% normal sodium carbonate, which comprises carbonating such a brine by contact with carbon dioxide bearing gas in such manner as to cause absorption of carbon dioxide by the brine at a rate of from 7 to 15 pounds of carbon dioxide per hour per 1000 gallons of brine and hence cause precipitation to occur princinpally in the form of coarsely crystalline sodium sesquicarbonate, until the sodium carbonate content of the brine is reduced below 10%, separating the resulting precipitate from the brine, subsequently subjecting the brine to a further carbonating operation by contact with carbon dioxide bearing gas to cause further precipitation to occur principally in the form of sodium carbonate, and then separating the resulting further precipitate from the brine.

7. A process for recovery of soda compounds and borax from brines containing the same which comprise first carbonating such a brine by contact with carbon dioxide bearing gas, while maintaining the rate of supply of carbon dioxide to the brine sufficiently low to so retard the carbonating reaction as to prevent the brine from being heated by the heat of such reaction to a temperature above 45° C. and hence cause precipitation to occur during such carbonating operation principally in the form of coarsely crystalline sodium sesquicarbonate, until the concentration of sodium carbonate in the brine has been materially reduced, then discontinuing the carbonating operation and separating the resulting precipitate from the brine, then cooling the brine for a sufficient length of time to cause precipitation of borax therefrom, separating the borax so precipitated from the brine, then subjecting the brine to a further carbonating operation by contact with carbon dioxide bearing gas to cause further precipitation principally in the form of sodium bicarbonate, and then separating the resulting further precipitate from the brine.

8. The process for recovery of soda compounds and borax from brines containing sodium carbonate and borax, the sodium carbonate being present materially in excess of 10% of the weight of the brine, which comprises carbonating such a brine by contact with carbon dioxide bearing gas containing less than 33% carbon dioxide so as to cause precipitation to occur during such carbonating operation principally in the form of sodium sesquicarbonate, until the sodium carbonate content of the brine is reduced below 10%, separating the resulting precipitate from the brine, cooling the brine to cause precipitation of borax therefrom, separating the borax so precipitated from brine, subjecting the brine to a further carbonating operation by contact with carbon dioxide bearing gas to cause precipitation of a further portion of the soda content of the brine principally in the form of sodium bicarbonate, and then separating the resulting further precipitate from the brine.

9. The process for recovery of soda compounds and borax from complex brines containing materially in excess of 10% normal sodium carbonate and also containing borax, which comprises carbonating such a brine by contact with carbon dioxide bearing gas in such manner as to cause absorption of carbon dioxide by the brine at a rate of less than 20 pounds of carbon dioxide per hour per 1000 gallons of brine and hence cause precipitation to occur principally in the form of coarsely crystalline sodium sesquicarbonate, until the sodium carbonate content of the brine is reduced below 10%, then discontinuing such carbonating operation and separating the resulting precipitate from the brine, cooling the brine to cause precipitation of borax therefrom, separating the borax so precipitated from the brine, subjecting the brine to a further carbonating operation to cause further precipitation principally in the form of sodium bicarbonate and separating the resulting further precipitate from the brine.

In testimony whereof I have hereunto subscribed my name this 22nd day of March, 1927.

WALTER A. KUHNERT.